United States Patent [19]

Knuchel et al.

[11] 4,167,774
[45] Sep. 11, 1979

[54] HOODS FOR RECORD PLAYERS

[76] Inventors: Paul Knuchel, Oberburgstr. 48b; Benedikt Strausak, Merienweg 19; Rudolf Laeng, Frideggstrasse 9; Josef Vavrina, Lyssachstr. 9a, all of CH-3400 Burgdorf, Switzerland

[21] Appl. No.: 833,742

[22] Filed: Sep. 16, 1977

[30] Foreign Application Priority Data

May 17, 1977 [DE] Fed. Rep. of Germany ....... 2722354

[51] Int. Cl.² ............................................. G11B 1/04
[52] U.S. Cl. ..................................... 362/87; 362/155; 362/396
[58] Field of Search .................. 362/80, 86, 87, 94, 362/133, 134, 137, 154, 155, 226, 396

[56] References Cited

U.S. PATENT DOCUMENTS

| 1,400,694 | 12/1921 | Phillips | 362/133 |
| 2,159,934 | 5/1939 | Preisz | 362/137 X |
| 3,350,552 | 10/1967 | Lawrence | 362/396 X |
| 3,781,790 | 12/1973 | Dawson | 362/396 X |

Primary Examiner—William M. Shoop
Assistant Examiner—Peter S. Wong
Attorney, Agent, or Firm—Albert L. Jeffers; John F. Hoffman

[57] ABSTRACT

A record player hood made of a plastic material which encloses a lamp and a tilt actuated switch therefor, wherein the lamp is clamped to the hood.

3 Claims, 3 Drawing Figures

HOODS FOR RECORD PLAYERS

This invention relates to improvements in hoods for record players.

A hood for a record player has been proposed comprising a hood for record players, or other sound recording or reproducing apparatus characterised in that on its inside is mounted a component containing a lamp with a switch.

Such a hood has the advantage that the upper side of the sound producing record player can be illuminated by the lamp. Such sound producing record players are freqently located in dark corners of a room. The switch is preferably designed as a tipping switch (mercury switch) so that upon lifting up the hood the lamp goes on and upon lowering the hood the lamp goes out.

According to the invention a hood for a record player comprises walls of a plastics material, a lamp and a switch housed within the walls forming a constructional unit.

The present invention is based on the problem of improving the hood to simplify the fixing of the lamp.

The improved hood is characterised by the provision of a clamping device connected to the housing of the hood.

The housing with lamp and switch is fixed by means of the clamp device simply from underneath on one side of the hood. The clamp device is desinged so that it fits all wall thicknesses of the side walls of the hood.

It is preferred for the mains cable of the lamp to be fixed on the housing.

Another preferred embodiment is characterised in that the clamp device comprises two resilient metal clamps. These metal clamps take over at the same time as the supply of current to the lamp.

Another embodiment is characterised in that the clamp is a U-shaped plastic member.

In addition the invention is further developed in that the clamp is formed with an extension for holding the cable.

The invention will be described with reference to the accompanying drawings.

Figure 1:
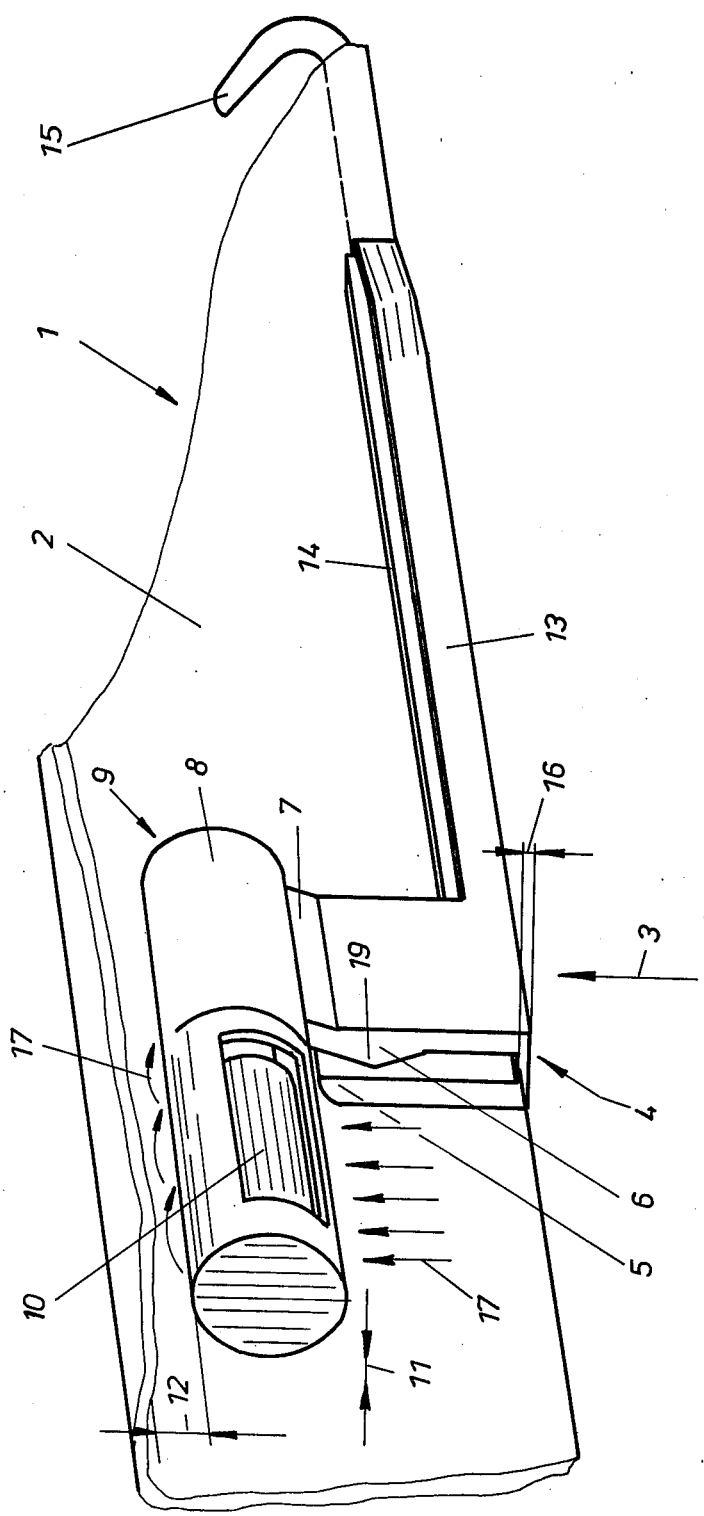
FIG. 1 shows in perspective a view of a hood of a record player with a lamp and clamp device according to the invention.

FIG. 1 shows diagrammatically a part of a hood 1 of a record player with a side wall 2. From below looking in the direction of the arrow 3 a clamp 4 in this embodiment (FIG. 1) is placed on the side wall 2 which consists of a U-shaped bent plastics member, the two legs of which are indicated with the reference 5 and reference 6 respectively.

The wall thickness of the side wall 2 may vary according to the model concerned. The clamp device may be adjusted to the wall thickness.

On the inner leg 6 of the clamp device 4 is fixed on integral extension 7 bent somewhat inwardly to which a housing 8 of a constructional unit 9 is connected which carries a lamp and an inclined switch is described more precisely in the main Application. In addition a lamp shade 10 is provided which may be moved and which illuminates the space under the hood 1, that is the top of the record player.

The housing of the lamp is due to the bending of the extension 7 kept at a predetermined distance from the inner wall of the hood by a lateral distance member 11 and an upper distance member 12.

Rearwardly extending continuations 13, 14 of the two legs 5, 6 are affixed thereto, the rear ends of which are bent inwards to clamp a mains cable 15 between them.

The thickness 16 of the base of the clamp device is minimal so that the clamp device is capable of being mounted on existing hoods. The arrows 17 show the cool air ascending through the heated air and guided around the housing of the lamp which air at the same time cools the lamp.

Figure 2:
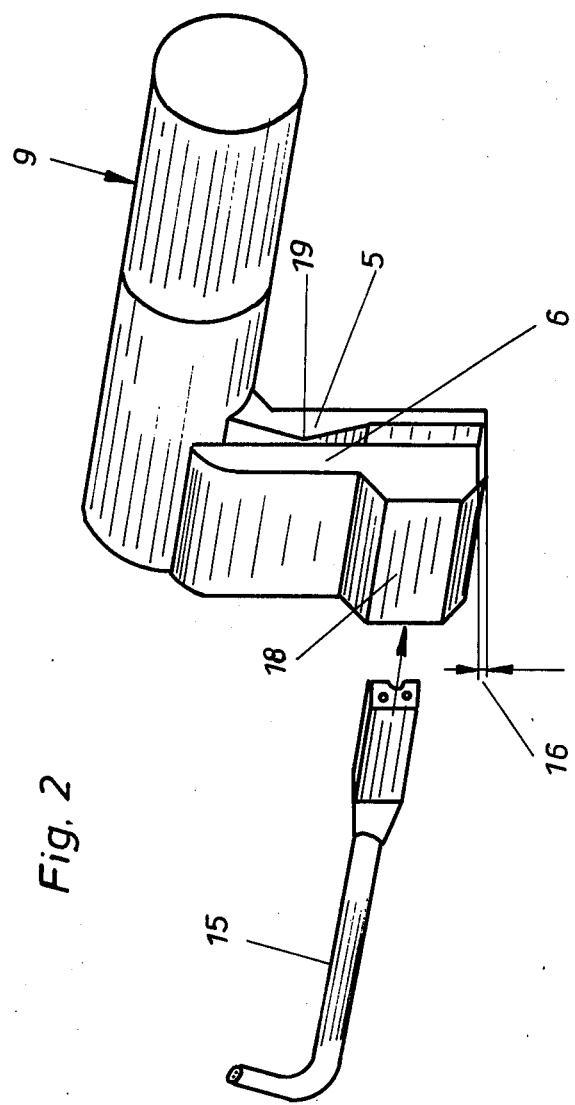
FIG. 2 is a perspective view of a further embodiment of a lamp and clamp device with an insertable mains cable.

FIG. 2 shows an alternative embodiment in which the mains cable 15 is plugged in. For this purpose the outer leg 6 of the clamp device 4 has an enlarged portion 18 which houses the contacts for the mains cable 15.

The inner leg 5 also has a conical inwardly directed enlargement which gives an improved clamping action and adaptation to different wall thicknesses. In the embodiment according to FIG. 1 a similar conical enlargement 19 is provided.

Figure 3:
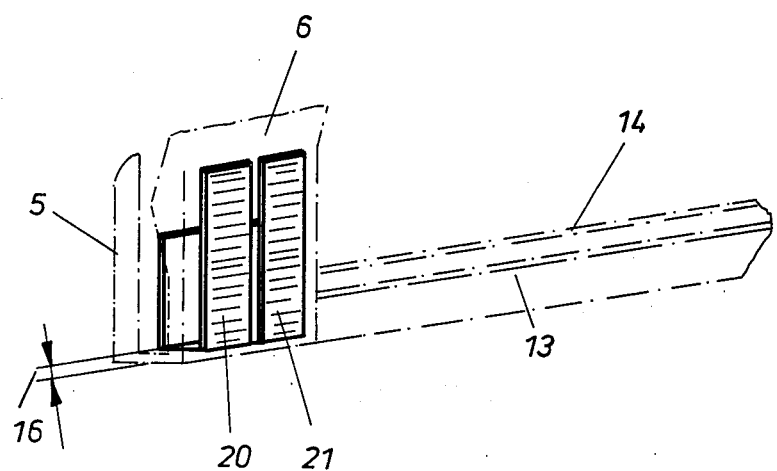
FIG. 3 shows two resilient metal clamps as constructional elements of the clamp device according to the invention in another embodiment.

In the embodiment according to FIG. 3 two flat springs 20, 21 are provided which are likewise bent into U-shape and at the same time serve for the supply of current to the lamp. The thickness of the springs 20, 21 is a minimum and due to the wall thickness also being minimal the clamps remain resilient.

The hood with the clampable lamp described may also be formed without the inclined switch mentioned in which case, for example, a conventional press button switch is used. An inclination switch is however preferred.

What we claim is:

1. An illuminating device adapted to be attached to an inside sidewall of a record player hood comprising: a U-shaped plastic clamp element having a pair of legs adapted to straddle the hood sidewall and a thin base element connecting said legs, a lamp secured to one of said legs, a pair of separate U-shaped metal terminal means embedded in said clamp element for providing the supply of current to said lamp from a mains cable connected to the other said leg of said clamp element, each of said terminal means being positioned in said clamp element to straddle the wall of the hood, and tilt actuated switch means mounted within said clamp element for turning on said lamp when inclined to a predetermined position, as when the hood is raised.

2. A record player hood comprising: a plurality of walls forming a cover, a U-shaped plastic clamp element straddling one of said walls and having a pair of legs, an inwardly extending projection on one of said legs, an integral extension portion on said one leg, a lamp connected to said extension portion, said extension portion extending outwardly away from said one wall so as to space said lamp from said one wall, tilt actuated switch means mounted within said clamp element for turning said lamp on when the hood is raised, and a pair of separate U-shaped metal terminal means imbedded in said plastic clamp element for providing the supply of current to said lamp for activating the same, each of said terminal means straddling said one wall.

3. The apparatus of claim 2 wherein said lamp is elongated and has its longitudinal axis extending generally parallel to said one wall.

* * * * *